United States Patent
Greer et al.

(10) Patent No.: US 7,194,424 B2
(45) Date of Patent: Mar. 20, 2007

(54) USER DEMOGRAPHIC PROFILE DRIVEN ADVERTISING TARGETING

(75) Inventors: Paul Greer, Portland, OR (US); Anand Pashupathy, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/293,393

(22) Filed: Dec. 1, 2005

(65) Prior Publication Data

US 2006/0085263 A1    Apr. 20, 2006

Related U.S. Application Data

(63) Continuation of application No. 08/882,197, filed on Jun. 25, 1997, now abandoned.

(51) Int. Cl.
*G06Q 30/00* (2006.01)

(52) U.S. Cl. ...................................................... 705/14
(58) Field of Classification Search ................... 705/14
See application file for complete search history.

(56) References Cited

U.S. PATENT DOCUMENTS

| | | | |
|---|---|---|---|
| 5,423,043 A | 6/1995 | Fitxpatrick et al. |
| 5,604,542 A | 2/1997 | Dedrick |
| 5,636,346 A | 6/1997 | Saxe |
| 5,710,884 A | 1/1998 | Dedrick |
| 5,717,923 A | 2/1998 | Dedrick |
| 5,754,938 A | 5/1998 | Herz et al. |
| 5,761,644 A | 6/1998 | Ueda et al. |
| 5,794,210 A | 8/1998 | Goldhaber et al. |
| 5,796,952 A | 8/1998 | Davis et al. |
| 5,855,008 A | 12/1998 | Goldhaber et al. |
| 5,931,907 A | 8/1999 | Davies et al. |
| 5,933,811 A | 8/1999 | Angles et al. |
| 5,948,061 A | 9/1999 | Merriman et al. |
| 5,978,842 A | 11/1999 | Noble et al. |
| 5,991,735 A | 11/1999 | Gerace |
| 6,009,410 A | 12/1999 | LeMole et al. |
| 6,014,638 A | 1/2000 | Burge et al. |
| 6,026,368 A | 2/2000 | Brown et al. |
| 6,279,112 B1 | 8/2001 | O'Toole et al. |

FOREIGN PATENT DOCUMENTS

WO    WO 97/22074 A1 *  6/1997

OTHER PUBLICATIONS

"C-Net: The Computer Network Unveils Revolutionary Internet Advertising Tools that Allow Custom Banner Ad Delivery Based on Demographic Information." PR Newswire, Dec. 6, 1995.*
Microsoft Press Computer Dictionary, Third Edition, Oct. 1997, ISBN 1572317434.

* cited by examiner

*Primary Examiner*—Susanna M. Diaz
(74) *Attorney, Agent, or Firm*—Blakely, Sokoloff, Taylor & Zafman LLP

(57) ABSTRACT

The invention relates to a method and apparatus for targeting advertising information transmitted over the Internet. The method involves creating a user profile and transmitting an agent and ad banner from a content provider to a target computer. At the target computer, information is collected and transmitted from the target computer to the content provider. The content provider filters the information to create relevant data. The content provider then munges the relevant data into a user specific database and selects new content for transmission over the Internet based on the new user specific database.

19 Claims, 3 Drawing Sheets

| RULE PAGE ID | HARDWARE PROFILE 210 | | | SOFTWARE PROFILE 212 | | USER PROFILE 216 | | OTHER PROFILE INFORMATION 220 |
|---|---|---|---|---|---|---|---|---|
| | CPU 224 | RAM 228 | CPU SPEED 232 | TOP 10 LIST 230 | MEMORY USAGE AND DISK USAGE 234 | HOW LONG CONNECTED TO THE WEB 238 | WEB SITES VISITED 242 | OTHER PROFILE INFORMATION 246 |
| 204 | | | | | | | | RULES SPECIFIC TO THE USER THAT ARE EXTRACTED OUT OF THE RULEBOOK. 254 |

FIGURE 2.

USER DEMOGRAPHIC PROFILE DRIVEN ADVERTISING TARGETING

BACKGROUND OF THE INVENTION

This application is a Continuation of application Ser. No. 08/882,197, filed Jun. 25. 1997 now abandoned.

1. Field of the Invention

The present invention relates generally to customizing advertisements transmitted over a computer network. More particularly, the present invention relates to transmitting advertising banners and an agent over the Internet to a target computer and using information collected by the agent running on the target computer to generating new advertising banners.

2. Description of Related Art

In recent years, advertising and marketing over computer systems connected to the Internet have become increasingly popular. Many well-known Internet service providers display advertisements along with entertainment, financial and business information available from these services. As more advertisers compete for limited ad space, the cost of placing an ad on these services has become more expensive. Furthermore, the proliferation of advertisements makes it difficult to keep consumers interested in a particular vendor's advertisement. Keeping a consumer's attention such that the consumer remembers the advertisement poses a constant challenge for marketing personnel. Furthermore, the limited bandwidth of transmissions media and the expense of placing an advertisement in highly visible areas of the Internet makes it desirable to target specific audiences rather than transmit numerous broadcasts to all consumers.

It is thus desirable to customize and target advertisements to particular audiences more likely to be interested in the particular advertisement or to which the advertising particularly pertains. Thus, the following invention discloses a method and apparatus for obtaining consumer information and customizing or targeting advertising content to correspond to the received information.

SUMMARY OF THE INVENTION

The invention relates to a method and apparatus for targeting advertising content. A content provider generates ad banners. The content provider transmits an agent to a target computer. The agent obtains user information and transmits the user information to the content provider. A program running on the content provider organizes the user information and updates a user specific database.

BRIEF DESCRIPTION OF THE DRAWINGS

The advantages of the present invention will become more readily apparent to those ordinarily skilled in the art after reviewing the following detailed description and accompanying drawings, wherein:

FIG. 2 illustrates an example of a typical rule page.

DETAILED DESCRIPTION OF THE INVENTION

Figure 1:
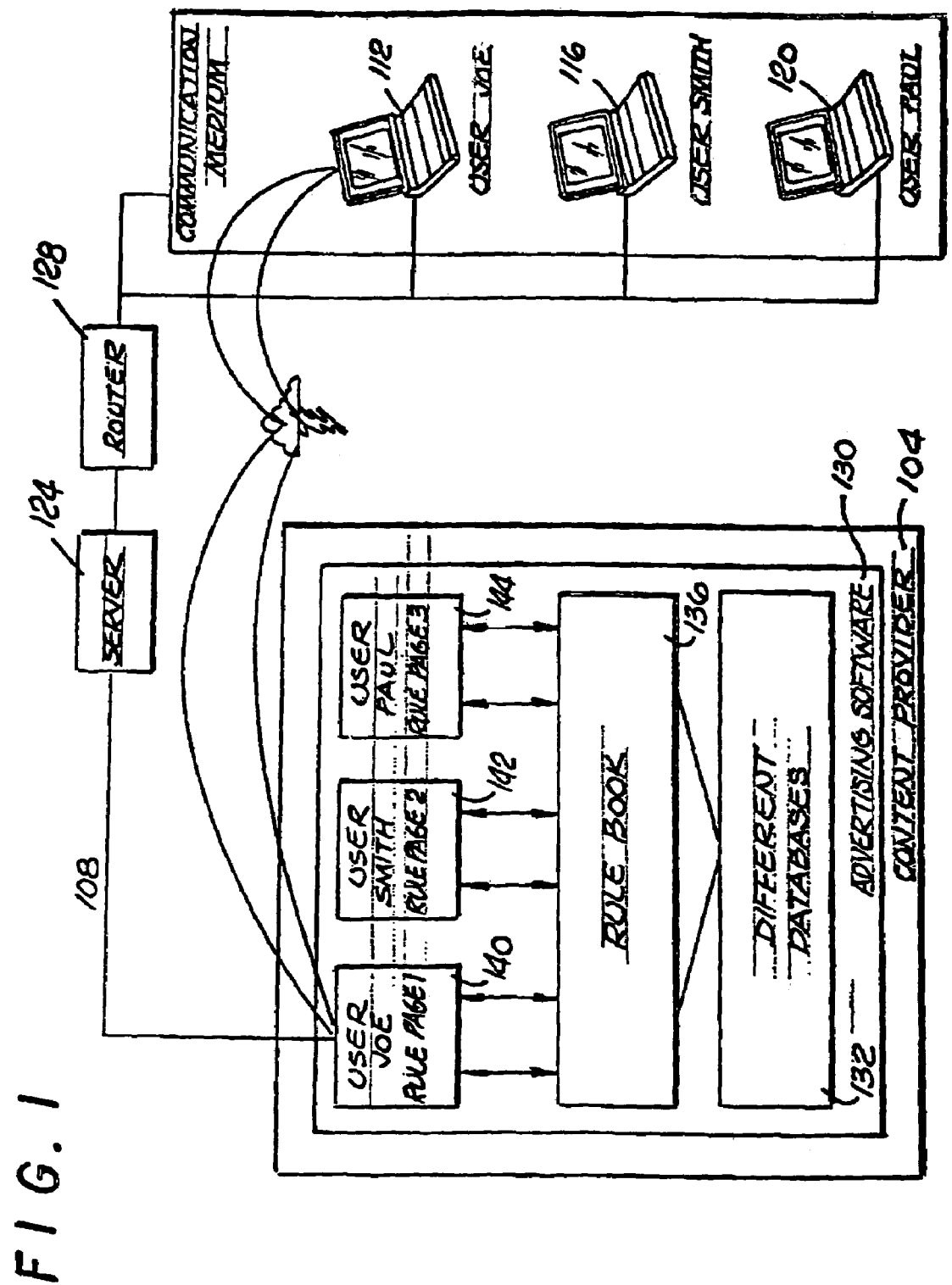
FIG. 1 is an overall diagram of an apparatus for performing targeted advertising.

A method and apparatus for targeted advertising is described. FIG. 1 illustrates a block diagram of an apparatus for customizing advertising content to a particular user. In FIG. 1, a content provider 104 transfers data along a communications medium 108 to a plurality of end users or target computers 112, 116, 120. The communications medium 108 may include a variety of communications methods including telephone lines, Integrated Services Digital Network ("ISDN") lines, a predetermined frequency channel and other methods of communicating information. In the preferred embodiment, the source of the data may be an Internet site transmitting data in an Internet format. However, it is contemplated that data may be provided by an Internet service provider or content provider 104 such as American OnLine, Prodigy and Compuserve. A server 124 and router 128 control the flow of information along the communications medium 108.

Advertising software 130, within the content provider 104 establishes a set of databases 132 containing advertising banners and other content for dissemination and transmission to target computers 112, 116, 120. The content directed into and out of database 132 is controlled by rules in a rule book 136. In one embodiment, the rules are records in a database. The control and direction of information by the rule book 136 is based on user profiles 140, 142 and 144. Each user profile, 140, 142, 144 contains information on a corresponding target computer 112, 116, 120. The initial information on a corresponding target computer may be obtained by an agent which is transmitted to the target computer 112.

In one embodiment, the agent consists of an object code for a control residing on a web page. The control is transmitted with the web page while a dormant object code resides on the server. The web page and the object code for the control are loaded into a cache on the target computer. The object code for the control may be interpreted or executed by the browser as the corresponding web page is loaded. The control object code is not changed unless the dormant object code in the server is changed. The described agent is a system used by Microsoft Corporation of Redmond, Wash. in its Active X™ control. In one embodiment, the user profile contains dynamic information on the corresponding target computer forwarded by the agent. The information may include Web sites visited, amount of time spent at a web site, software used, and hardware configuration of the target computer.

FIG. 2 illustrates one embodiment of a rule page in the user profile. A rule page can be a file in a Relational Database Management System (RDBMS) or an Object Oriented Database Management System (OODBMS). These databases may contain many rule pages. The entire database will be accessed randomly. In one embodiment, the server caches each rule page on the basis of usage. Each rule page is identified or connected to a particular computer via a rule page identification "ID" number 204. The rule page itself 200 is divided up according to keys 208. In the embodiment shown, the keys 208 include a hardware profile 210, a software profile 212, a user profile 216 and other profile information 220. Each key 208 includes information pertaining to the specific target computer or target user associated with the rule page ID 204. For example, the hardware profile 210 may be divided into subkeys 222 which contain information such as the CPU used 224, the amount of RAM available 228 and the CPU clock speed 232. The software profile key 212 may include subkeys 222 containing information such as the most popular software packages used by the target computer in a "top 10 list" 230, and a memory usage subkey 234 including the memory usage disk space occupied by the software being used.

The user profile key 216 includes dynamic information relating to the end user using the target computer. From this information, a profile of the targeted user can be created. Typical information in such a profile may include information on length of time the user has been connected to the Internet 238 and the Internet Web sites frequented by the user 242. Miscellaneous information may be collected in an extra profile information key 220. Information indicating the amount of time spent by the end user on a particular window or screen at a particular Web site may also be collected by the agent and stored. For example, if a user spends more time on basketball articles or a screen depicting basketball related images, the rule book computer will focus transmitted information and advertisements to basketball related activity or create advertisements centered around a basketball theme.

Each subkey 222 may be further subdivided into smaller units of data which further profiles the targeted user. Using information stored in the user profile, the rule book generates rules specific to the targeted user. These rules may be extracted from the rule book and stored in a user specific rules section 254 of the rule page. These user specific rules enable the creation of a user specific profile for filtering and transmission of advertising banners and information.

Figure 3:
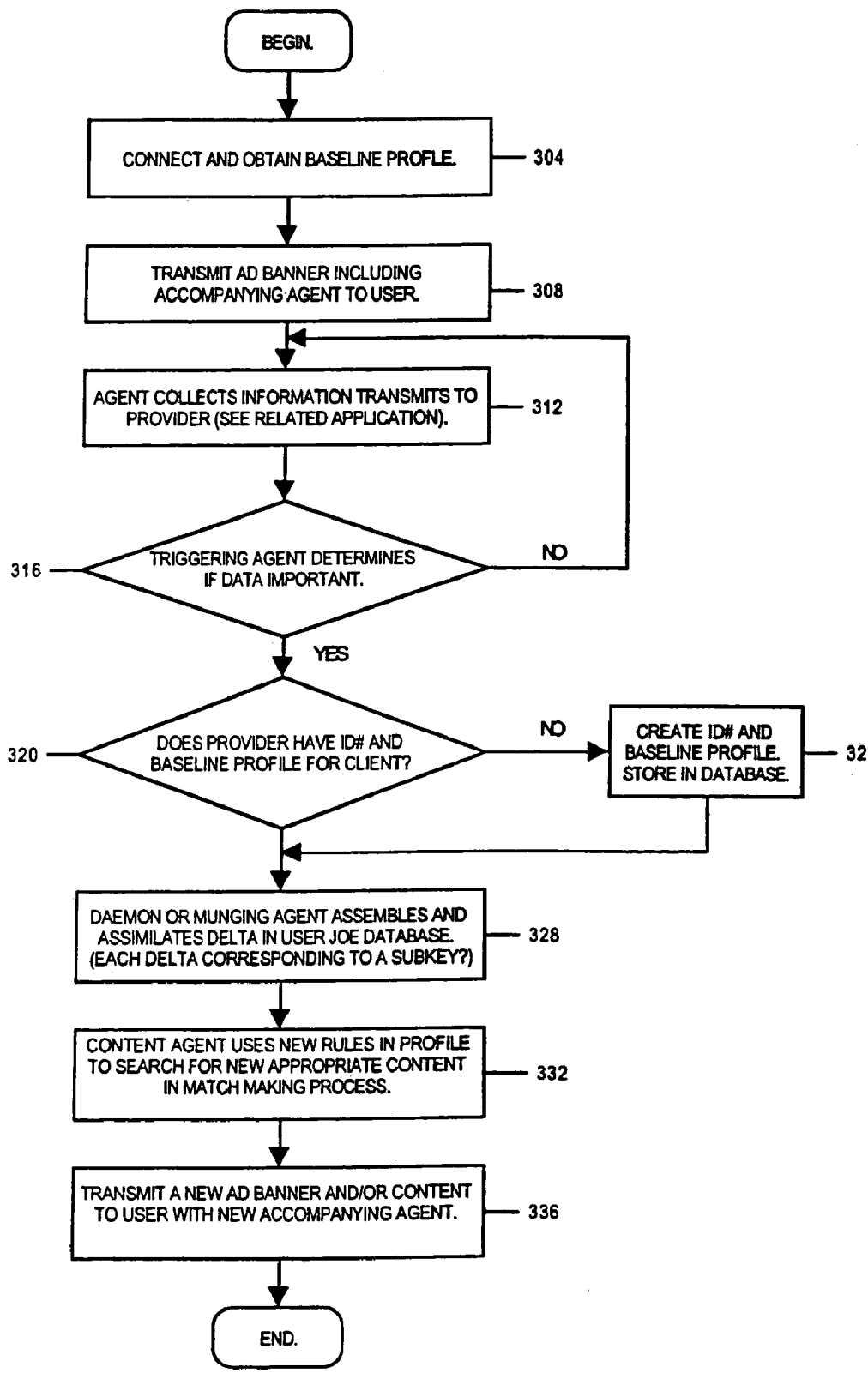
FIG. 3 is a flowchart illustrating one proposed method of implementing a targeted advertising system.

FIG. 3 is a flowchart illustrating a method of targeting advertisements to a particular user. In step 304, when a user connects to the website, the baseline profile is created. The baseline profile may be created using information from an agent initially transmitted to the target computer upon connection. The detection and maintenance of an already existing account happens on the server. The agent runs on the target computer CPU and determines critical information regarding the target computer to generate the baseline profile. Such a baseline profile may include static or rarely changing information such as information in the hardware profile key 208 and in the software profile key 212. Once a basic baseline profile has been established, the content provider transmits a standard advertising banner to the target computer. Alternatively, the content provider may generate a specific advertising banner for the user using information in the rule book. In the preferred embodiment, the content provider transmits an agent with the advertising banner to the target computer in step 308. The agent may be the same agent which established the initial baseline profile. In the preferred embodiment, this agent is a small program typically on the magnitude of 10 kilobytes, which may be specific to the advertising banner and is independent of the agent which established the baseline profile using CPU time on the target computer. The agent collects data from the target computer. In one embodiment, the agent utilizes MICROSOFT® ACTIVE X™ technology to collect information from target computer and transmit that collected information back to the content provider in step 312. A description of Active X technology is available at the Microsoft Web site at http://www.Microsoft.com/intdev/sdk/actlogo.htm.

In one embodiment of a target computer, a single target computer may communicate with several content providers. In such an embodiment, the target computer may maintain several provider rule pages. Each provider rule page includes information from a corresponding specific provider. Using a target computer rule book in the target computer, the target computer creates static and dynamic profiles of each provider very similar to the profiles maintained by the content providers of the target computers.

Although the described embodiment describes a small agent that runs on the target machine and is transmitted with the ad banner, it is contemplated that other types of agents may be used. General agents, agents which are not associated with a specific ad banner and are transmitted separately from the ad banner may be used. In the preferred embodiment, the agent is not specific to the browser being used by the target computer. Using an agent which is independent from the browser allows a single content provider to obtain information from multiple target computers, even if the multiple computers use different browsers.

A triggering program determines if the data is important in step 316. In one embodiment, the triggering program may be part of the agent program, thus the agent filters information before transmission. In an alternate embodiment, the triggering program is run in the content provider. If the triggering program determines that the data collected by the agent is not important, the content provider returns to step 312 instructing the agent to collect further information.

When the triggering program determines that data is significant, the content provider verifies that an identification code "ID" has been created for the particular user and that a baseline profile has been established in step 320. The baseline profile includes various keys. The received information is matched to a corresponding key in step 320. If a particular key or baseline profile has not been established for the computer which transmitted the information, the appropriate key and/or baseline profile is created and the incoming information integrated into the database in step 324. In step 328, a daemon or munging agent assimilates the agent transmitted information into the user specific rule page. A daemon or munging agent is an application program running on the content provider which assimilates the incoming data by categorizing incoming data and updating the user rule page if the data has changed or inserting new data into appropriate areas of the user rule page. In step 332, the new user rule page is used to generate a modified profile. The modified profile runs through a set of rules in rule book identifying new content for transmission to the target computer.

The rules in the rule book form the basis for selecting content delivered to the target computer. The rules are typically stored in the rule book in the form of condition-action pairs. For example, a rule could be—if CPU is greater than or equal to PENTIUM®, then: deliver content from a first database where the first database contains high fidelity content. In one embodiment, rules can be cascaded to form new rules; for example—if CPU is greater than or equal to Pentium®, and modem is greater than or equal to 28.8 Kbps speed, then provide content from a second database wherein the second database includes graphic content which requires high processing and transmission rates. The rules or condition action pairs in the rule book may be in the form of Scripts or an interpreted language script such as VB Script which are capable of performing booleen operations such as comparing data in a rule page with predetermined values. Thus the rules can perform matching of graphic content with target computer capabilities as well as other characteristics of the target user.

User specific rules also allow for customizing ad banners to take into account dynamic information. For example, if a user spends more than 10 minutes at basketball Web sites, or clicks on many icons associated with basketball, a rule might be developed if basketball is greater than scale 10, then deliver content from a particular section of a particular database. This section of the database would have basketball related information. In one embodiment, the information from the database would be used to fill in voids in a generic ad banner. In an alternative embodiment, the user specific data could be used to create a completely customized ad banner.

A method is also provided to remove old information or to account for changing user interests. Thus, if the end user did not visit basketball Web sites for a significant period of time, the user specific rules could be configured to automatically reduce the scale corresponding to a users interest in basketball relative to a user's other interests.

In step 336, an updated custom ad banner including new content is transmitted to the user or target computer. The ad banner may be designed to best utilize the capability of the user's computer. The content is also specific to interest profiles of the user associated with an account on the ISP or the target computer. In some embodiments, a new accompanying agent may also be transmitted with the new ad banner.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system comprising:
    a target computer to receive a content including an advertisement; and
    a content provider coupled to the target computer via a network to transmit the content, the content provider comprising:
    an advertisement database storing a plurality of advertisements, wherein a standard advertisement from the advertisement database is selected based upon a baseline profile automatically obtained from an initial agent initially transmitted to the target computer upon connection of the target computer to the content provider, the initial agent operating upon the target computer to determine the baseline profile, and wherein a content agent is then transmitted to the target computer with the standard advertisement;
    a user rule page updated with information automatically obtained from the target computer by the content agent, the content agent having a triggering program to filter information and to determine whether the information is relevant to the user rule page, wherein the content agent is an object code for a control residing on a web page and the control is transmitted with the web page while a dormant object code resides on a server, wherein a munging agent munges the information determined to be relevant by the content agent into the user rule page to update the user rule page;
    a rulebook to provide a rule based on the user rule page, the rule controlling a selection of an updated customized advertisement from the advertisement database, wherein the rule is stored in form of a condition-action pair, the user rule page including: a hardware profile indicating hardware capabilities of the target computer, a software profile indicating software used by the target computer, and a user profile including dynamic information related to a user using the target computer, the dynamic information including information on web sites visited and time spent by the user on the websites; and
    wherein the content agent updates information in the user rule page based upon information received from the target computer and based upon the updated user rule page selects the updated customized advertisement from the advertisement database, the updated customized advertisement is then transmitted to the target computer.

2. The system of claim 1 wherein the agents use an internet programming language.

3. The system of claim 1 wherein the hardware profile includes a modem speed.

4. The system of claim 3 wherein the hardware profile includes a type of processor, an amount of memory available, processor clock speed and memory usage on the target computer.

5. The system of claim 4 wherein the software profile includes a software package and memory usage by the target computer.

6. The system of claim 1 wherein the advertisements are transmitted in an internet protocol format.

7. The system of claim 6 wherein the advertisements are advertisement banners.

8. The system of claim 7 wherein the target computer communicates with additional content providers, and wherein the target computer maintains several provider rule pages of the additional content providers.

9. The system of claim 8 wherein each provider rule page includes information from at least one of the additional content providers.

10. A system comprising:
    a content provider coupled to a target computer via a network to transmit the content, the content provider comprising:
    an advertisement database storing a plurality of advertisements, wherein a standard advertisement from the advertisement database is selected based upon a baseline profile automatically obtained from an agent initially transmitted to the target computer target computer to the content provider, the initial agent operating upon the target computer to determine the baseline profile, and wherein a content agent is then transmitted to the target computer with the standard advertisement;
    a user rule page updated with information automatically obtained from the target computer by the content agent, the content agent having a triggering program to filter information and to determine whether the information is relevant to the user rule page, wherein the content agent is an object code for a control residing on a web page and the control is transmitted with the web page while a dormant object code resides on a server, wherein a munging agent munges the information determined to be relevant by the content agent into the user rule page to update the user rule page;
    a rulebook to provide a rule based on the user rule page, the rule controlling a selection of an updated customized advertisement from the advertisement database, wherein the rule is stored in form of a condition-action pair, the user rule page including: a hardware profile indicating hardware capabilities of the target computer, a software profile indicating software used by the target computer, and a user profile including dynamic information related to a user using the target computer, the dynamic information including information on web sites visited and time spent by the user on the websites; and
    wherein the content agent updates information in the user rule page based upon information received from the target computer and based upon the updated user rule page selects the updated customized advertisement from the advertisement database, the updated customized advertisement is then transmitted to the target computer.

11. The system of claim 10 wherein the agents use an internet programming language.

12. The system of claim 10 wherein the hardware profile includes a modem speed.

13. The system of claim 12 wherein the hardware profile includes a type of processor, an amount of memory available, processor clock speed and memory usage on the target computer.

14. The system of claim 13 wherein the software profile includes a software package and memory usage by the target computer.

15. The system of claim 10 wherein the advertisements are transmitted in an internet protocol format.

16. The system of claim 15 wherein the advertisements are advertisement banners.

17. The system of claim 16 wherein the target computer communicates with additional content providers, and wherein the target computer maintains several provider rule pages of the additional content providers.

18. The system of claim 17 wherein each provider rule page includes information from at least one of the additional content providers.

19. The system of claim 18 wherein the hardware profile includes a modem speed, a type of processor, an amount of memory available, processor clock speed and memory usage on the target computer and the software profile includes a software package and memory usage by the target computer.

* * * * *

UNITED STATES PATENT AND TRADEMARK OFFICE
CERTIFICATE OF CORRECTION

PATENT NO. : 7,194,424 B2 Page 1 of 1
APPLICATION NO. : 11/293393
DATED : March 20, 2007
INVENTOR(S) : Greer et al.

It is certified that error appears in the above-identified patent and that said Letters Patent is hereby corrected as shown below:

In column 1, at line 7, delete "25." and insert --25,--.

In column 6, at line 35, after "an" insert --initial--.

In column 6, at line 26, after "computer" insert --upon connection of the--.

Signed and Sealed this

Twenty Second Day of April, 2008

JON W. DUDAS
*Director of the United States Patent and Trademark Office*